Jan. 27, 1942.  L. C. CORCORAN  2,270,931
FIELD GLASS HOLDER
Filed Aug. 18, 1941
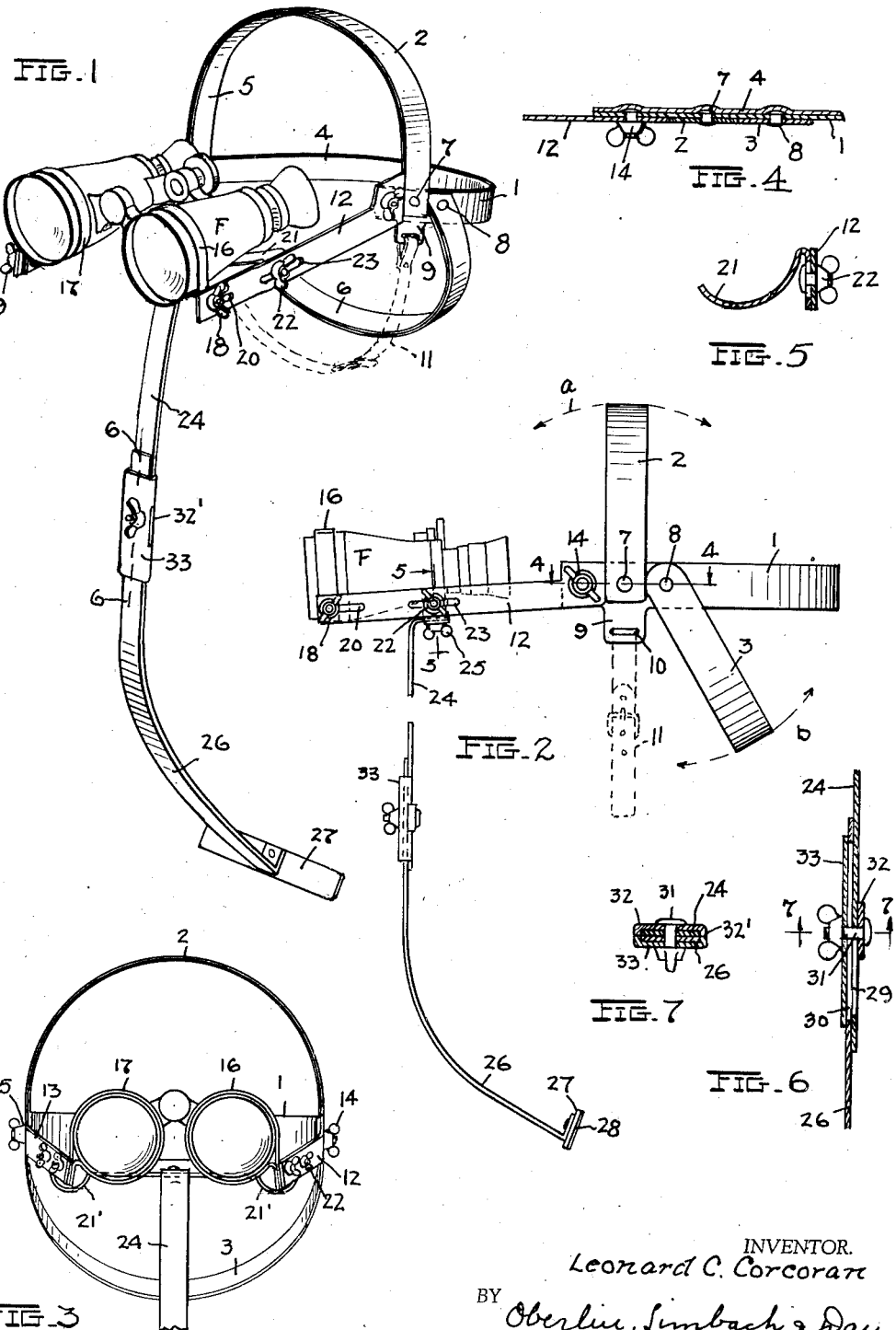
INVENTOR.
Leonard C. Corcoran
BY Oberlin, Limbach & Day
ATTORNEYS Patented Jan. 27, 1942

2,270,931

UNITED STATES PATENT OFFICE 2,270,931

FIELD GLASS HOLDER

Leonard C. Corcoran, University Heights, Ohio

Application August 18, 1941, Serial No. 407,373

6 Claims. (Cl. 88—36)

The present invention relates to a novel device for supporting optical instruments, such as binoculars or field glasses, in operative position before the eyes of the user, so that the latter might have both of his hands free for other uses and purposes. The invention is particularly adapted for modern military use, wherein the user of binoculars or field glasses finds it increasingly necessary to have both of his hands free so that he might operate signalling devices, manipulate the controls of mechanized engines of warfare, or perform similar duties and operations.

Furthermore, when a relatively heavy optical instrument, such as field glasses, are held in the hands before the user's eyes for relatively long periods of time, the arms naturally become tired and unsteady, thus interfering with the clarity and accuracy of the user's vision. Inasmuch as field glasses possess considerable weight, it is not possible to mount them before the user's eye merely by means of a head strap or temple bows which have heretofore been employed for supporting the lighter optical aids, such as spectacles and goggles.

It is therefore a further object of the invention to provide a supporting device capable of carrying the relatively increased weight of field glasses, binoculars, and the like, and to retain them in a steady and secure position before the user's eyes.

Still another object of the invention is to provide means for distributing the weight of the supported field glasses between the user's head and a portion of his torso, so that undue or tiring strain is not exerted upon the neck muscles.

Another object of the invention is to provide adjustable means for accommodating different sizes of field glasses, so that one type or size may be substituted for the other in the holder.

Still another object is to provide adjustable means in the component parts of the holder itself whereby it may be readily fitted to the different sizes and head contours of individual users.

To the accomplishment of the foregoing and related ends, said invention, then, consists of the means hereinafter fully described and particularly pointed out in the claims.

The annexed drawing and the following description set forth in detail certain structure embodying the invention, such disclosed means constituting, however, but one of various structural forms in which the principle of the invention may be used.

In said annexed drawing:

Fig. 1 is a perspective view of the field glass holder embodying the principle of my invention and showing a pair of field glasses held in position thereon;

Fig. 2 is a side elevational view of the device of Fig. 1;

Fig. 3 is a front elevational view of the head mounting portion of the holder;

Fig. 4 is a detailed sectional view taken substantially along line 4—4 of Fig. 2;

Fig. 5 is another detail sectional view taken substantially along line 5—5 of Fig. 2;

Fig. 6 is a detail sectional view taken along line 6—6 of Fig. 1; and

Fig. 7 is a transverse sectional view of Fig. 6 and taken along the line 7—7 thereof.

As a general examination of the drawing reveals, the device embodying my invention consists primarily of three major elements, viz.: a head gear adapted to be mounted upon the user's head, a field glass supporting platform projecting forwardly from the head gear, and a torso contacting support member connected at its upper end to the field glass supporting platform.

Now referring more particularly to the drawing, the head gear part of the device comprises a horizontal head strap 1 adapted to pass around the back of the user's head. A vertical head strap 2, adapted to go over the top of the user's head, and an angularly inclined head strap 3 adapted to pass around and contact the lower back portion of the head, are also provided. The head strap elements 1, 2 and 3 are preferably fabricated of a relatively thin, flexible material, such as steel, aluminum, or a strong non-metallic material such as a plastic. A fabric lining, such as shown at 4, 5 and 6, for the head strap elements 1, 2 and 3 respectively, may be provided and such lining is suitably fabricated from leather, cloth, rubber or similar soft compressible material.

The head strap elements 2 and 3 are pivotally mounted upon the strap 1 by means of the rivets 7 and 8. The rivets 7 and 8 make a binding fit with the elements which they hold together, so that the latter may be pivotally moved by the exertion of manipulating pressure. Thus the top head strap 2 may be swung through an arc substantially as indicated at A and the lower head strap 3 through an arc such as indicated at B, and when moved to such positions will remain therein. By manipulating the straps 2 and 3 it will be seen that various sizes and contours of the human head can be accommodated.

A pair of depending portions or ears 9 forming an integral part of the head strap 1, each have slots 10 in which the adjustable length chin strap 11 is attached. Only one of the ears 9 of course appears in the drawing, but they are located in vertical alignment with the pivotal point of attachment of the top head strap 2.

A pair of forwardly projecting bars 12 and 13 are pivotally attached to each end of the head strap 1 by means of the screws and wing nuts 14 and 15 respectively. The relative horizontal angle of the bars 12 and 13 with respect to the head strap 1 can be adjusted by the loosening and tightening of the wing nuts 14 and 15.

Clamping rings 16 and 17, having such a diameter as to surround the outer ends of the field glasses F, are mounted upon the outer ends of each of the bars 12 and 13, and by means of screws and wing nuts indicated at 18 and 19. Elongated slots 20 are provided in the bars 12 and 13 for the latter screws, so that longitudinal adjustment may be made for clamping various lengths of field glasses in the clamping rings 16 and 17.

A cross bar 21 is attached at its transversely bent, terminal ends to the mid portion of the bars 12 and 13. Again screws and wing nuts as indicated at 22, these screws being mounted in the elongated slots 23, are provided for adjusting the relative longitudinal position of the cross bar 21 with respect to the bars 12 and 13. The bar 21 is preferably composed of a deformable material, so that it may be bent up into various positions of contact, as indicated at 21', with the rearward portions of the field glasses F.

The bars 12 and 13 and the cross bar 21 thus provide a supporting platform for the field glasses F. A substantially vertical supporting member, adapted to contact at its lower end with the torso, i. e. the chest or abdomen of the user, is in turn provided for such field glass supporting platform. This latter member comprises two strap elements 24 and 26. The strap 24 is attached by means of a screw and wing nut 25 to the mid portion of the cross bar 21. The strap 26 has a contacting plate 27 mounted upon its transversely bent end and a facing 28 of soft compressible material, such as leather, rubber or the like, is attached to the surface of the contacting plate 27. The length of the vertical platform supporting element comprising the straps 24 and 26, is made adjustable over a wide range by means of the structure best shown in Figs. 6 and 7. Thus, elongated slots 29 and 30 are provided in the overlapping ends of the straps 24 and 26 respectively. The screw 31 passes through the slots 29 and 30 and on its rear or headed end, mounts a flanged bearing plate 32. On the front or wing nut end of the screw 31 there is mounted a relatively larger bearing plate which is of a length slightly in excess of that of the slot 30. The bearing plate 33 also has edge flanges which are recessed at a point adjacent the screw 31 in order to receive the flanges 32' of the rear bearing plate 32.

Thus, when the straps 24 and 26 are moved to a position corresponding to their fullest longitudinal extent, viz., when the screw 31 contacts with the lower end of the slot 29 and with the upper end of the slot 30, the bearing plate 33 serves as a reinforcing member holding the slightly overlapping ends of the straps 24 and 26 against lateral collapse.

It will thus be seen that my above described device accomplishes the objects hereinabove first indicated, and at the same time provides a reliable and secure field glass holder, capable of being fabricated and assembled at relatively economical cost.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. A device for supporting relatively heavy optical instruments such as field glasses and the like in operative position before the eyes, comprising a head gear, a field glass supporting platform pivotally attached to the forward end of said head gear, said platform comprising a pair of parallel bars pivotally attached to said head gear, annular clamping members adapted to surround the forward end of the field glasses, said clamping members being mounted upon each of said parallel bars in positions of longitudinal adjustment, and a cross bar extending between said parallel bars at the medial portions of the latter, and a substantially vertically disposed reinforcing support member attached at its upper end to said cross bar and adapted to contact the torso at its lower end.

2. A device for supporting relatively heavy optical instruments such as field glasses and the like in operative position before the eyes, comprising a head gear, a field glass supporting platform pivotally attached to the forward end of said head gear, said platform comprising a pair of parallel bars pivotally attached to said head gear, angular clamping members adapted to surround the forward end of the field glasses, said clamping members being mounted upon each of said parallel bars in positions of longitudinal adjustment, a cross bar extending between said parallel bars at the medial portions of the latter, a substantially vertically disposed reinforcing support member attached at its upper end to said cross bar and adapted to contact the torso at its lower end, and means for adjusting the length of said vertical support member.

3. A device for supporting relatively heavy optical instruments such as field glasses and the like in operative position before the eyes, comprising a head gear, a field glass supporting platform pivotally attached to the forward end of said head gear, said platform comprising a pair of parallel bars pivotally attached to said head gear, angular clamping members adapted to surround the forward end of the field glasses, said clamping members being mounted upon each of said parallel bars in positions of longitudinal adjustment, a cross bar extending between said parallel bars at the medial portions of the latter, a substantially vertically disposed reinforcing support member attached at its upper end to said cross bar and adapted to contact the torso at its lower end, said vertical support member being composed of two elongated straps overlapping each other at their ends, such ends having elongated slots therein, a fastening screw and nut passing through said slots, and a flanged bearing plate overlying one of said last-named straps and also carried by said screw, said bearing plate being of greater length than that of the slot in said last-named strap.

4. A device for supporting relatively heavy optical instruments such as field glasses and the like in operative position before the eyes comprising a head-gear and a field glass supporting platform; said platform comprising a pair of substantially parallel bars hingedly mounted upon said head-gear, a cross bar connecting said parallel bars and means to retain said field glasses upon said platform there being other means present to retain said platform in position in front of the eyes or out of operative position above said head-gear.

5. A device for supporting relatively heavy optical instruments such as field glasses and the like in operative position before the eyes comprising a head-gear and a field glass supporting platform; said platform comprising a pair of substantially parallel bars hingedly mounted upon said head-gear, a cross bar connecting said parallel bars and means to retain said field glasses upon said platform there being other means present to retain said platform in position in front of the eyes or out of operative position above said head-gear, said head-gear comprising three head straps pivotally attached to each other, each of said head straps being adapted to surround the top, the back and the lower back portions respectively of the user's head.

6. A device for supporting relatively heavy optical instruments such as field glasses and the like in operative position before the eyes comprising a head-gear and a field glass supporting platform; said platform comprising a pair of substantially parallel bars hingedly mounted upon said head-gear, a cross bar connecting said parallel bars and means to retain said field glasses upon said platform there being other means present to retain said platform in position in front of the eyes or out of operative position above said head-gear, said head-gear comprising three head straps pivotally attached to each other, each of said head straps being adapted to surround the top, the back and the lower back portions respectively of the user's head, said cross bar and said means to retain said field glasses upon said platform being adjustably mounted upon said parallel bars.

LEONARD C. CORCORAN.